Patented Jan. 3, 1950

2,493,460

UNITED STATES PATENT OFFICE 2,493,460

SPRAY RESIDUE REMOVAL COMPOSITION AND METHOD

Rudolph H. Larsen, San Francisco, and Fred Bresee, Jr., San Mateo, Calif., assignors to Fred Bresee, Jr., doing business as Balab, San Francisco, Calif.

No Drawing. Application June 2, 1947, Serial No. 752,000

10 Claims. (Cl. 99—103)

1

This invention relates generally to compositions and methods for the removal of spray residues from various agricultural products, particularly fruits and vegetables.

The constant war being waged against the attacks of insects and fungi on commercial crops has resulted in the continual development of new types of insecticides and fungicides. During recent years considerable success has been gained by the use of spray compositions of the DDT type. For best effectiveness it is desirable that DDT and other spray compositions remain upon the surface of the fruit for a considerable period of time, thus making it necessary to remove the spray residue before the product is marketed. In the past it has been common to wash the fruit or other crop in a solution capable of dissolving or washing off the residue, after which the fruit is rinsed with fresh water and dried. Reasonably satisfactory solutions have been developed for the removal of the more common spray compositions, such as for example, Bordeaux mixture, lead arsenate, calcium arsenate, nicotine sulfate, and the like, but it has been found that such compositions are not satisfactory for removing certain types of fluorine compounds, or the more recently developed organic products such as phenothiazine, or dichloro diphenyl trichloroethane (DDT). With certain types of fruit the problem of spray removal is further complicated by the fact that during the growing period the fruit develops a natural wax coating, the thickness and character of which varies with different fruits and for different localities. It appears from microscopic examinations that an appreciable portion of any spray residue on such fruit is completely or partially covered by the coating of natural wax. Such residue cannot be removed by ordinary washing solutions.

It is an object of the present invention to provide a new composition for the removal of spray residues from agricultural products, and which will be effective in the removal of certain types of spray compositions difficult to remove by conventional solutions, including DDT.

Another object of the invention is to provide a composition of the above character which is effective in removing toxic spray residues from fruit like apples or pears which have a natural wax coating.

Another object of the invention is to provide a new method for the removal of spray residues, characterized by use of our new composition.

Additional objects and features of the present invention will appear from the following description in which the preferred embodiment has been set forth in detail.

In general the primary ingredients of our composition comprise (a) a solvent capable of limited softening and solvent effect upon natural fruit wax, (b) a wetting agent capable of lowering the surface tension of the composition and the washing solution, and (c) a suitable soap capable of suspending and dispersing the loosened wax and particles of spray residue. With these primary ingredients it is desirable to use a coupling agent to provide a miscible liquid composition. The composition is prepared as a liquid concentrate and added to water in small percentages to provide the desired washing solution.

The solvent employed serves an important and desirable function. In the course of our investigations on the removal of DDT spray residue from pears, we found that ordinary conventional washing solutions do not materially affect the natural wax coating of the pear, and as previously pointed out, it is the natural wax which tends to entrap or imbed the particles of the residue. We have found that the solvent as used in our composition has a softening or limited dissolving effect upon the wax, and this serves to free the spray particles for removal. We have found that certain non-aromatic white hydrocarbon oils, or spray oils of about 40 to 70 seconds viscosity (Saybolt) at 100° F., have the desired limited solvent action upon natural fruit wax. This group of materials includes such products as refined or purified kerosene, Stoddard solvent, and light summer spray oil.

The wetting agent is a necessary ingredient of the composition, and insures a low surface tension of the washing solution. A low surface tension assists in better penetration of the wax by the washing solution, and thorough wetting out of residue material which may be lying at the bottom of depressions and pores in the surface of the fruit. The wetting agent further serves the purpose of improving the effectiveness of the subsequent rinse, which generally follows the washing operation.

We have found that a satisfactory wetting agent is an alkyl aryl sulfonate with a molecular weight falling within the range of 230 to 310, the average being about 270. Preferably we employ an alkyl aryl sulfonate composed of a sulfonated benzene ring to which are attached two hydrocarbon side chains each averaging 3 to 4 carbon atoms in length, and it is desirable that the molecular weight be of the order of 270 to 280. Specific examples of such wetting agents are sodium alkyl aryl sulfonate and sodium alkyl benzene sulfonate. A wetting agent of this type has excellent stability in acid solutions, which is a desirable characteristic in that in many instances it is desirable to add acids to the washing solution for the effective removal of certain types of residues.

The soap has also been found to be a necessary ingredient to the composition. The soap appears to impart the attribute to the washing solution of suspending and dispersing the loosened wax and such particles of spray residue as are released from the surface of the fruit. Effective dispersion of the spray residue particles is also a necessary adjunct to efficient rinsing of the fruit after being subjected to the washing solution.

A relatively wide variety of soaps can be used in our composition. Thus the organic or anionic portion of the soap may consist of members of the saturated and unsaturated fatty acid series. Examples of the saturated fatty acids are caprylic, capric, lauric, myristic, palmitic, stearic, arachidic, behenic and lignoceric. Of the unsaturated series we can use myristoleic, palmitoleic, oleic, elaidic, lenoleic, elolostearic, palmetolic, tairirie, ricinoleic, liconic, and chaulmoogric. In general it can be stated that we prefer to employ a fatty acid of the 18 carbon type having one or more unsaturated bonds. Other suitable acids are naphthenic from petroleum, as well as purified aliphatic acids derived from petroleum naphtha which contain normal and branched-chain aliphatic acids in the C-6 to C-12 range.

For the alkaline or cationic portion or the soap we can use such inorganic alkalies as lithium, sodium, potassium and ammonium hydroxides. We can also use organic alkaline materials such as isopropylamine, butylamine, mono-, di-, and triethanolamine. Also 2-amino-1-butanol, 2-amino-2-methyl-1-propanol, 2-amino-2-methyl-1, 3-propanediol, 2-amino-2-ethyl-1, 3 propanediol and tris (hydroxymethyl) aminomethane. Any one or more of the above mentioned alkaline compounds will give satisfactory results. One soap with which we have secured good results and which is generally deemed preferable is triethanolamine oleate.

By way of example a particular composition which we have used with good results is as follows:

Refined kerosene 10% (by weight)
Sodium alkyl benzene sulfonate having a molecular weight of 280—67%
Oleic acid 13%
Triethanolamine 3%
Isopropyl alcohol 7%

The wetting agent included in the above formula was actually prepared by dissolving 55% of the sodium alkyl benzene sulfonate with 45% of water. The isopropyl alcohol in the above composition performs the desirable function of making the ingredients completely miscible as a liquid concentrate. In place of isopropyl alcohol as a coupling agent, it is satisfactory to use such materials as diethylene glycol, methyl or ethyl Cellosolve. The isopropyl alcohol is desirable because of its low cost and ready availability.

A proportioning of the ingredients in our composition can be varied for the purpose of adapting the composition to various conditions and types of fruit. The amount of solvent can be within the range of from 5 to 25%, the wetting agent from 50 to 90%, the acid portion of the soap from 5 to 40%, the alkali portion of the soap from 1 to 10%, and the coupling agent from 1 to 5%.

Only a small amount of this concentrate is added to water to make a washing solution. Thus in the washing of pears for the removal of DDT spray residue, a solution containing from 1 to 2% of our composition gives satisfactory results. As previously pointed out the washing solution may include one or more additional ingredients which have been used in conventional washing solutions, such as hydrochloric acid, or various compounds such as carbonates, phosphates and silicates.

The washing solution can be applied to the fruit by any of the ways now used with conventional solutions. The fruit is either immersed in the solution or the solution applied to the fruit by spray application. After a period of retention in contact with the solution, as for example from 30 to 60 seconds, the fruit is dipped in or sprayed with a rinse of fresh water.

Actual laboratory tests have shown that when pears containing DDT spray residue have been treated with our washing solution in the manner described above, about 78% of the spray residue present is removed. An examination of the pears after being treated by our method reveals that a substantial amount of natural wax remains, sufficient to insure proper preservation of the fruit. Furthermore it has been found that our solution does not leave any objectionable residue upon the fruit, such as might detract from preservation or marketability of the product.

The temperature of the washing solution when applied to the fruit will vary in different instances. In general the temperature should be correlated with the time period of contact with the solution, that is a shorter period of contact should be used with higher temperatures. In any event the temperature should not be sufficiently high to cause injury to the fruit.

While our laboratory and test work has been confined to removing spray residue from pears, it is evident that the invention is applicable to a relatively wide variety of products, including fruits such as apples, apricots, peaches and the like, and also various vegetables. While such products (with the exception of apples) may not contain wax comparable to the wax found on pears, various surfacing substances are present which tend to form a fast bond with particles of spray residue, thus tending to impair the effectiveness of conventional washing solutions.

During normal use of a solution prepared with our composition, there is a negligible amount of foaming. In other words our composition and solution does not depend for its effectiveness upon foaming action. In this connection the low molecular weight wetting agent employed is a relatively poor foamer, and also the solvent employed, such as refined kerosene, tends to kill foam. Likewise a wetting agent of the type specified tends to kill the normal foaming properties of a soap such as triethanolamine oleate. A washing solution which does not foam is a distinct advantage in use of the same in equipment of the type normally employed for such operations, because it facilitates handling of the solution, and obviates the messiness attendant with foam formation. Should foam persist under certain conditions it is desirable to add a foam dispersing agent, such as tributyl phosphate.

We claim:

1. A concentrated liquid composition adapted to be introduced into water to form a washing solution capable of removing spray residues from agricultural products, said composition comprising a hydrocarbon oil capable of acting as a solvent upon the fruit wax, an alkyl aryl sulfonate wetting agent within the molecular weight range of 230 to 310, a fatty acid of the 18 carbon type having at least one unsaturated bond, and an alkaline agent combined with the fatty acid to form a soap.

2. A concentrated liquid composition adapted to be added to water to form a solution for removing spray residues from agricultural products, a composition comprising from 5 to 25% of hydrocarbon oil having a solvent effect upon fruit wax, 50 to 90% of an alkyl aryl sulfonate within the molecular weight range of 230 to 310, from 5 to 40% of a fatty acid of the 18 carbon type having at least one unsaturated bond, and from 1 to 10% of an alkaline agent combined to form a soap with fatty acids.

3. A concentrated liquid composition adapted to be added to water to form a solution for removing spray residues from agricultural products, comprising 5 to 25% of refined kerosene, 50 to 90% of an alkyl aryl sulfonate composed of a sulfonated benzene ring to which are attached two hydrocarbon side chains each averaging 3 to 4 carbon atoms in length and having a molecular weight of the order of 270 to 280, and 5 to 40% of oleic acid reacted with 1 to 10% of triethanolamine.

4. The composition of claim 1, together with a coupling agent to render the ingredients miscible.

5. The composition of claim 2, together with from 1 to 5% isopropyl alcohol.

6. The process of removing spray residue from agricultural products by subjecting them to the action of an aqueous solution containing from 1 to 2% of the composition specified in claim 1.

7. The process of removing spray residue from agricultural products by subjecting them to the action of an aqueous solution containing from 1 to 2% of the composition specified in claim 3.

8. A process of removing DDT spray residues from fruit having a natural wax surface upon the same, the process comprising subjecting the fruit to the action of an aqueous solution containing from 1 to 2% of the composition specified in claim 1.

9. A process of removing DDT spray residues from fruit having a natural wax surface upon the same, the process comprising subjecting the fruit to the action of an aqueous solution containing from 1 to 2% of the composition specified in claim 3.

10. A concentrated liquid composition adapted to be added to water to form a solution for removing spray residues of the dichloro diphenyl trichlorethane type from agricultural products, comprising a nonaromatic white hydrocarbon oil having a viscosity of about 40 to 70 seconds at 100° F., an alkyl aryl sulfonate composed of a sulfonated benzene ring to which are attached two hydrocarbon side chains each averaging 3 to 4 carbon atoms in length and having a molecular weight of the order of 270 to 280, together with triethanolamine oleate.

RUDOLPH H. LARSEN.
FRED BRESEE, Jr.

REFERENCES CITED

The following references are of record in the file of this patent:

UNITED STATES PATENTS

| Number | Name | Date |
| --- | --- | --- |
| 2,044,246 | Johnson | June 16, 1936 |
| 2,105,606 | McLean et al. | Jan. 18, 1938 |
| 2,398,242 | Morgon et al. | Apr. 8, 1946 |

OTHER REFERENCES

Borden et al.: "The Blue Anchor," vol. 24, No. 2, page 19, May 1947.

California Fruit Growers Exchange: "Cleaning Citrus Fruit," Oct. 1931, pages 24–25.

Gregory: "Uses and Applications of Chemicals and Related Materials," page 626, Reinhold Publishing Corp., New York, 1939.